United States Patent
Kirby et al.

(10) Patent No.: US 6,340,498 B2
(45) Date of Patent: *Jan. 22, 2002

(54) POROUS COMPOSITION FOR USE IN AN ENVIRONMENT OF VARIABLE PRESSURE AND/OR VARIABLE TEMPERATURE

(75) Inventors: John Stephen Kirby, Laguna Beach; John Miles Watcher, Laguna Hills, both of CA (US)

(73) Assignee: The Boeing Company, Seattle, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,062

(22) Filed: Oct. 14, 1999

(51) Int. Cl.[7] .................................................. B05D 7/00
(52) U.S. Cl. ..................... 427/220; 427/215; 427/221; 427/385.5; 427/421; 106/672; 106/674; 106/676; 524/9; 524/16; 524/492
(58) Field of Search ................................. 427/212, 215, 427/216, 220, 221, 385.5, 388.1, 421, 427; 106/672, 674, 676; 524/9, 16, 492

(56) References Cited

U.S. PATENT DOCUMENTS

| | | | |
|---|---|---|---|
| 3,660,849 A | * 5/1972 | Jonnes et al. | 2/2.1 |
| 3,844,863 A | 10/1974 | Forsythe et al. | 156/98 |
| 4,031,059 A | 6/1977 | Strauss | 260/37 SB |
| 4,077,921 A | 3/1978 | Sharpe et al. | 260/2.5 B |
| 4,204,899 A | 5/1980 | Walker et al. | 156/212 |
| 4,472,201 A | * 9/1984 | Ochi et al. | 106/98 |
| 4,772,495 A | 9/1988 | Headrick et al. | 427/386 |
| 4,837,250 A | 6/1989 | Headrick et al. | 523/179 |
| 5,064,868 A | 11/1991 | Simpson et al. | 521/54 |
| 5,476,879 A | * 12/1995 | Woods et al. | 521/78 |
| 5,736,197 A | * 4/1998 | Gaveske | 427/393 |

* cited by examiner

Primary Examiner—Shrive P. Beck
Assistant Examiner—Jennifer Calcagni
(74) Attorney, Agent, or Firm—Lawrence N. Ginsberg

(57) ABSTRACT

A mixture of a binder and a particle material, the mixture having 50 to 90 volume percent of the particle material. The binder is curable in a temperature range of 50° F. to 90° F. The volume percent of the present composition provides an inherent permeability in any conventional application method. It can be sprayed or applied by hand and yet it still maintains an intrinsic permeability.

15 Claims, 4 Drawing Sheets

POROUS COMPOSITION FOR USE IN AN ENVIRONMENT OF VARIABLE PRESSURE AND/OR VARIABLE TEMPERATURE

STATEMENT OF GOVERNMENT INTEREST

This invention was made under Government Contract F04701-96-C-0001 awarded by the US Air Force. The Government has certain rights in this invention.

BACKGROUND OF THE INVENTION

1. Field of the Invention

The present invention relates to porous materials and more particularly to a porous composition for use in an environment of variable pressure and/or variable temperature.

2. Description of the Related Art

The Payload Fairing (PLF) is the portion of a launch vehicle that encloses the payload, i.e., satellite. One purpose of the PLF is to protect the satellite from the loads and aerodynamic heating associated with launching the satellite into space. Another is that the PLF protects the satellite from contamination, as even the smallest particle of dust or debris could render the satellite useless. The PLF and all parts of the PLF must be designed so that substantially no particles, dust, or any other type of possible contamination would fall onto the payload.

In order to protect the PLF structure from the effects of aerodynamic heating, a thermal protection material is placed over the PLF structure, particularly over the nose on the front of the PLF, which receives the majority of aerodynamic heating. One such thermal protection material is known as MCC-1 (for NASA Marshall Convergent Coating). This material was developed by NASA for use on the Space Shuttle, but is also used by the Air Force on the PLF of the Titan IV launch vehicle. MCC-1 is applied robotically and requires the use of an ancillary material, to repair the MCC-1 and to fix application defects. To repair MCC-1 NASA uses what is known as K5NA, a mixture of epoxy and cork, that serves the NASA application on the solid rocket motors of the Space Shuttle well. But, the solid rocket boosters do not have the same contamination requirement as the Titan IV PLF. Testing showed that the NASA repair material (i.e., K5NA) would not meet the Titan IV PLF contamination-free requirement. It was demonstrated that small pieces of the NASA repair material would break off during flight. Since the portion of the PLF that needed the most thermal protection material was the forward nose cone of the PLF, i.e., directly in front of the payload, any particles coming off the repair material were almost certainly going to contaminate the payload.

It was found that "popped off" small pieces of the repair material were the result of air being entrapped in the material during the process of mixing the ingredients. The aerodynamic heating of the material increased the pressure of the entrapped air, while at the same time the external air pressure was dropping to the vacuum of space. In addition, the heating reduced the strength of the repair material. As a result the repair material failed, leading to the generation of the "pop off" particles. MCC-1 did not suffer this same fate, because MCC-1 was permeable, allowing the entrapped air to escape without doing damage to the material. The inherent permeability of MCC-1 was the result of the fact that the material was sprayed onto the PLF. MCC-1 had air inside of the material, which increased its efficiency as a thermal protection material, but the air was not entrapped. MCC-1 was permeable, allowing any air in the material to escape as the local air pressure dropped, or the air expanded due to the aerodynamic heating. Because of the robotic application of MCC-1, it was not a suitable repair material, particularly at the launch site, located away from the factory at which MCC-1 was applied with special equipment.

It was found that pulling a vacuum on the NASA repair material after mixing the ingredients removed the larger air bubbles, but did not make the material permeable. As a result, when the repair material was used to cover MCC-1, the air entrapped in the MCC-1 pushed pieces of the repair material off. It was clear that a material that could easily be mixed, applied by hand or with a simple spray process, cured at ambient conditions (~50° F. to 90° F.), and was permeable, was required.

U.S. Pat. No. 4,204,899, issued to Walker et al., entitled "Cork-Resin Ablative Insulation for Complex Surfaces and Method of Applying the Same," discloses a cork-resin ablative insulation material, which may be applied to complex surfaces. The material is intended for broad coverage and is limited to resins that can be B-staged to form the thin, pliable cork sheet that is applied to the surface. It could not be used to fill in nicks, blemishes or other defects. Since it contains 20 to 60 weight percent resin, the cork content would be 40 to 80 weight percent. Such a large concentration of cork would not yield a material that could be worked by hand, or troweled onto a surface. Present applicants' investigations have revealed that if more than 20 weight per cent cork (~90 volume percent due to the differences in density of the resin and cork) is used, the material will not hold together or bond to the substrate to be repaired, e.g., MCC-1.

U.S. Pat. No. 3,844,863, issued to Forsythe, et al., entitled "Repair of Wooden Articles," discloses a method to repair defects and holes in wood. In a preferred composition, the comminuted cork comprises from 3 to 10 percent by weight of the mixture. Such low weight percentages of cork would not achieve the desired effect of a contamination-free thermal insulator in a variable temperature/variable pressure environment.

U.S. Pat. No. 4,031,059, issued to Strauss, entitled "Low Density Ablator Compositions," discloses two types of highly filled, elastameric silicone-base ablative compositions whose densities range from about 0.2 g/cc to about 0.3 g/cc. One type is a carbon char-forming, high thermal efficiency ablator containing at least 92% by volume of low-density filler with a total filler-to-resin volumetric ratio of at least 16 to 1. The material's core content is too high to allow its application in a hand-packing mode. It would have to be molded into final shape, obviating its ability to act as a repair material. The second type of material disclosed by Strauss is a silica char-forming, RF-transparent ablator containing at least 90% by volume of low-density filler with a total filler-to-resin volumetric ratio of at least 11 to 1. Again, this material would have to be molded into final shape, obviating its ability to act as a repair material.

U.S. Pat. No. 4,077,921, issued to Sharpe, et al., entitled: "Sprayable Low Density Ablator and Application Process," discloses a sprayable, low density ablative composition having 100 parts by weight of a mixture of 25–65% by weight of phenolic microballoons, 0–20% by weight of glass microballoons and 4–10% by weight of glass fibers, 25–45% by weight of an epoxy-modified polyurethane resin, 2–4% by weight of a bentonite dispersing aid and 1–2% by weight of an alcohol activator for the bentonite; b) 1–10 parts by weight of an aromatic amine curing agent; and c) 200–400 parts by weight of a solvent. These additives are insufficient to achieve permeability effects required to prevent "pop-off."

U.S. Pat. Nos. 4,772,495 and 4,837,250, both entitled "Trowelable Ablative Coating Composition and Method of Use," both issued to Headrick et al. disclose coating compositions which have insufficient quantities of cork particle to prevent pop-off.

U.S. Pat. No. 5,064,868, issued to Simpson et al., entitled "Sprayable Lightweight Ablative Coating," discloses another composition with insufficient quantity of cork to prevent pop-off in a variable pressure/variable temperature environment.

OBJECTS AND SUMMARY OF THE INVENTION

It is therefore a principal object of the present invention to meet the contamination-free requirements of the material to be used in a variable temperature and/or variable pressure environment.

Another object is to provide a material that could be either sprayed onto hardware or applied by hand.

Another object is to provide a composition, which can be applied in ambient conditions.

Yet another object is to provide a composition that is thermally insulative.

These and other objects are achieved by the present composition, which in its broadest aspects comprises a mixture of a binder and a particle material. The mixture has 50 to 90 volume percent of the particle material. The binder is curable in a temperature range of 50° F. to 90° F.

The volume percent of the present composition provides an inherent permeability in any conventional application method. It can be sprayed or applied by hand and yet it still maintains an intrinsic permeability.

It can be used as a primary material or a repair material where prevention of "pop-off" is important.

The material can also be used over another material that has air or another gas or even a liquid entrapped in it and let the gas/fluid out without causing damage to either material. Because the material is permeable, it can operate repeatedly in a variable pressure and/or variable temperature environment without being damaged due to the effects of the entrapped gas/fluid. Some applications require that these materials experience temperatures as high as 900° F. for very short periods of time. One example would be use as a thermal protection material on a launch vehicle. Pressure ranges for the launch vehicle application would range from 1 to 0 atmospheres. Another application, e.g., underwater, could result in large pressure increases being applied to the material in the range of 1 to 40 atmospheres. Current generation materials would be limited to the level of such environments because the current generation materials are subject to damage by the entrapped air.

These and other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENTS

Figure 1B:
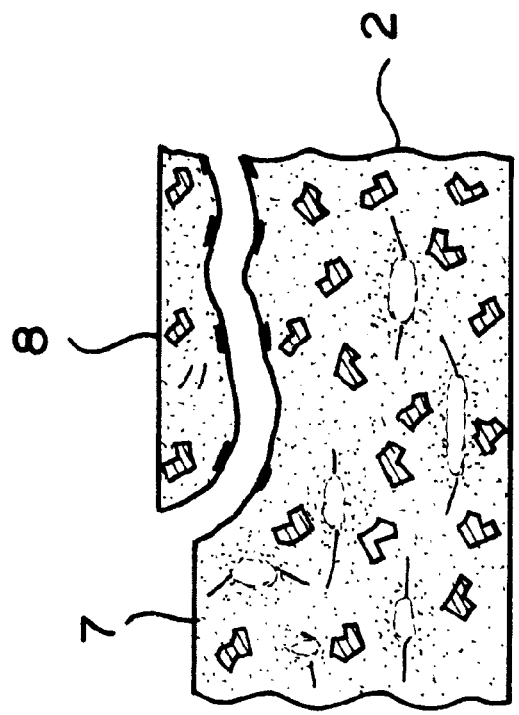
FIG. 1b (Prior Art) is an enlarged cross-sectional view of the conventional composition of FIG. 1a showing the crack having propagated to the surface, resulting in loss of material.

As discussed above, in conventional thermal insulation materials air is entrapped during the mixing process. When used in an application that experiences variable temperature and/or variable pressures the pressure of the air is increased with respect to the outside pressure. Since the air is entrapped it applies an internal pressure to the material which is in many cases weakened by the applied temperature. FIG. 1a shows a conventional composition, designated generally as 2. The composition 2 includes a mixture of a binder 3 and a particle material 4. Air pockets 5 are the result of the mixing process, and cannot be avoided.

Conventional hand-mixed compositions contain fewer particle materials per unit volume than the composition of the present invention. As a result, the entrapped air pockets 5 are generally not connected. Air is also trapped as a thin surface layer next to the cork particles. Thus, the air cannot traverse the material and escape. Hence, for example, when the ambient air pressure is reduced, for example, during a launch, and the ambient air temperature is increased, the pressure in the air pockets 5 is increased. This pressure can induce cracks 6 in the binder material 3.

Figure 1A:
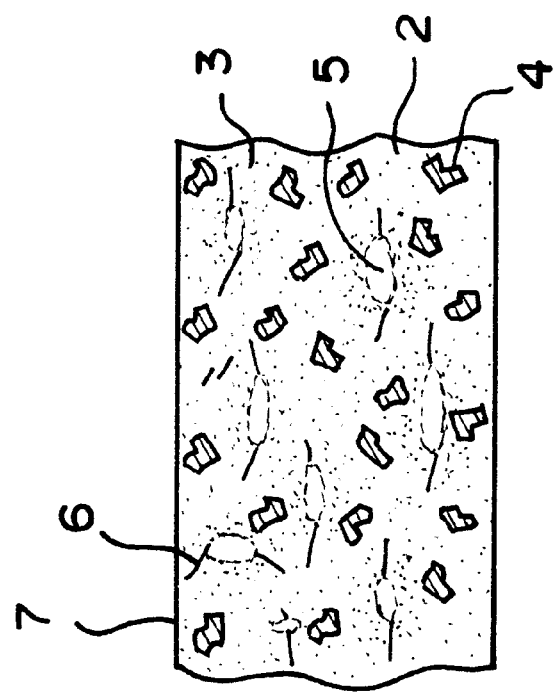
FIG. 1a (Prior Art) is an enlarged cross-sectional view of a conventional composition showing entrapped air and cracks in the composition due to the combined effects of external pressure and external temperature changes.

Referring now to FIG. 1b, a crack 6 can propagate to the surface 7, resulting in a small particle 8 being ejected from the main portion 2 of the material. This phenomenon is known as "pop-off."

Figure 2:
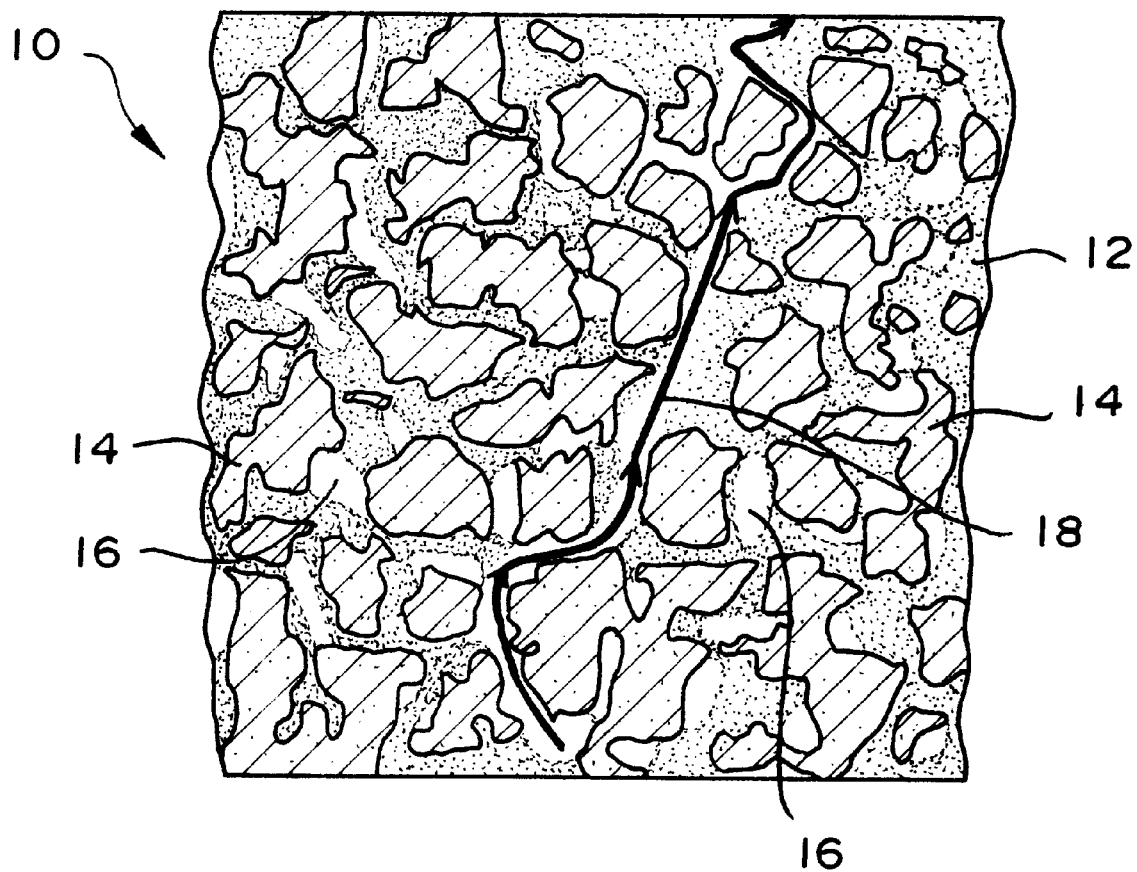
FIG. 2 is an enlarged cross-sectional view of a first embodiment of the present invention in which closed-cell porous particle material is utilized, showing a permeability path.

Referring now to FIG. 2, a first embodiment of the present invention is illustrated, designated generally as 10. The porous composition 10 comprises a mixture of a binder 12 and a particle material 14. The particle material 14 is a closed cell porous particle material. The closed cell porous particle material comprises 70 to 90 volume percent of the composition 10. Examples of closed cell porous particle materials include cork and sandstone.

The binder may comprise a resin, such as epoxy. Another example binder is cement. Both epoxy and cement cure at 50° F. to 90° F.

Fabrication of the material includes mixing the binder constituents and then adding the particle and continuing the mixing process. The resulting composition can either then be directly applied by hand trowelling to a surface, or can be sprayed onto the surface.

As a result of this mixing process, there are entrapped air pockets 16; however, the number and distribution of the air pockets 16 are such that they are generally interconnected.

A line designated by numeral designation 18 shows one of many paths that air can take to escape the material 10. The characteristic property of this material, i.e., that air can flow therethrough is referred to as permeability. The conventional composition shown in FIGS. 1a and 1b has virtually no permeability.

Figure 3:
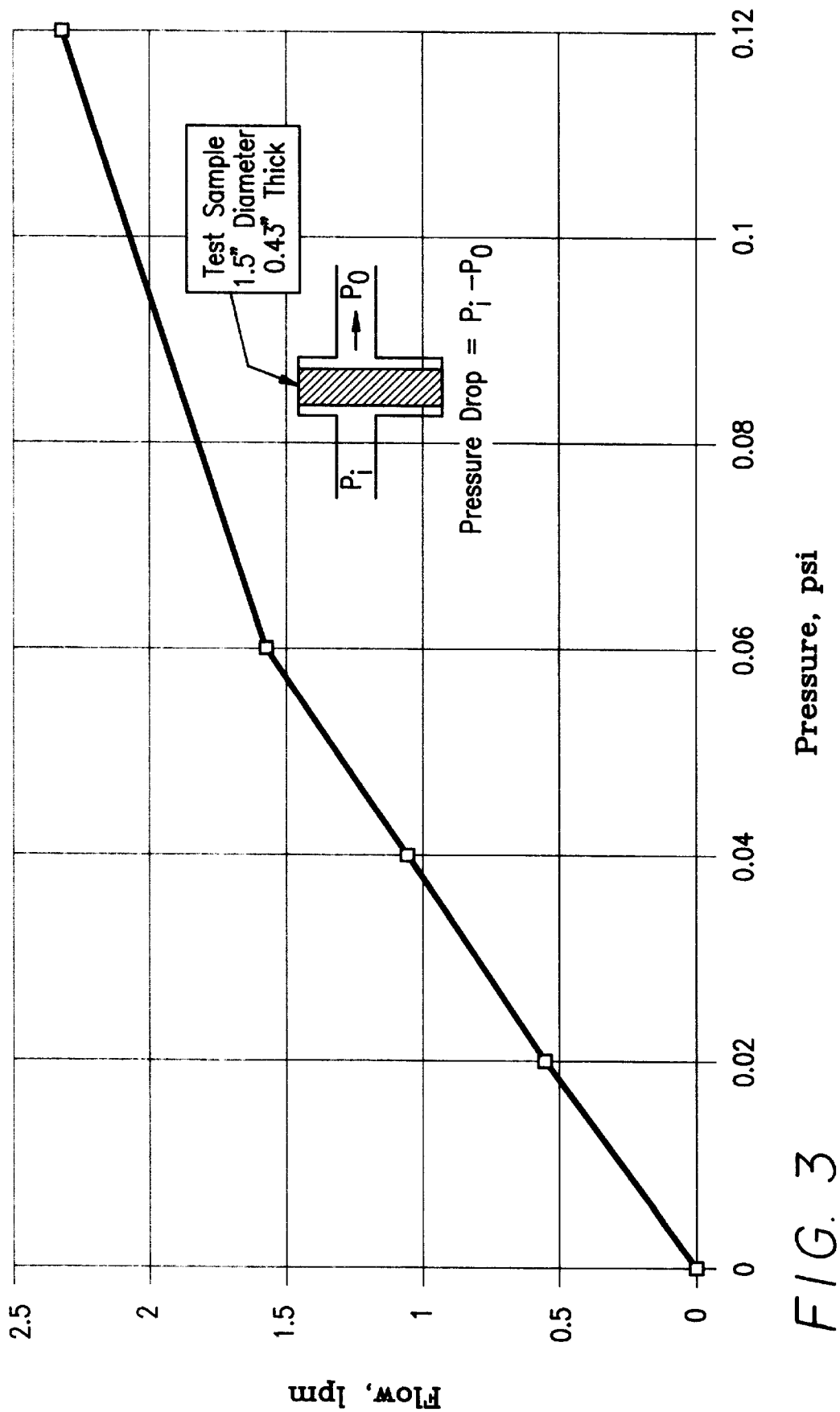
FIG. 3 is a graph of flow rate (liters per minute) vs pressure drop (psi) which embodies results from a specific experiment, showing the intrinsic permeability of the composition of the present invention.

Referring now to FIG. 3, the results of a test to measure the permeability of the present composition is illustrated. The sample had a binder of EC2216 epoxy resin. It had 85 volume percent cork particles. It was mixed by hand and applied to a Teflon covered aluminum plate. A round sample was machined and fit into a tube such that the sample fit the entire tube. Pressure was applied on one side of the sample and the flow rate measured on the other side. Tests on the conventional composition showed a zero flow rate for all pressures, indicating that the material was not permeable. As seen in FIG. 3, a measurable flow rate was obtained using the composition of the present invention, indicating that air can flow through the material. Under test conditions similar to those discussed in FIG. 1, the present composition exhibited no "pop-off" and no cracking was observed in the material.

Figure 4:
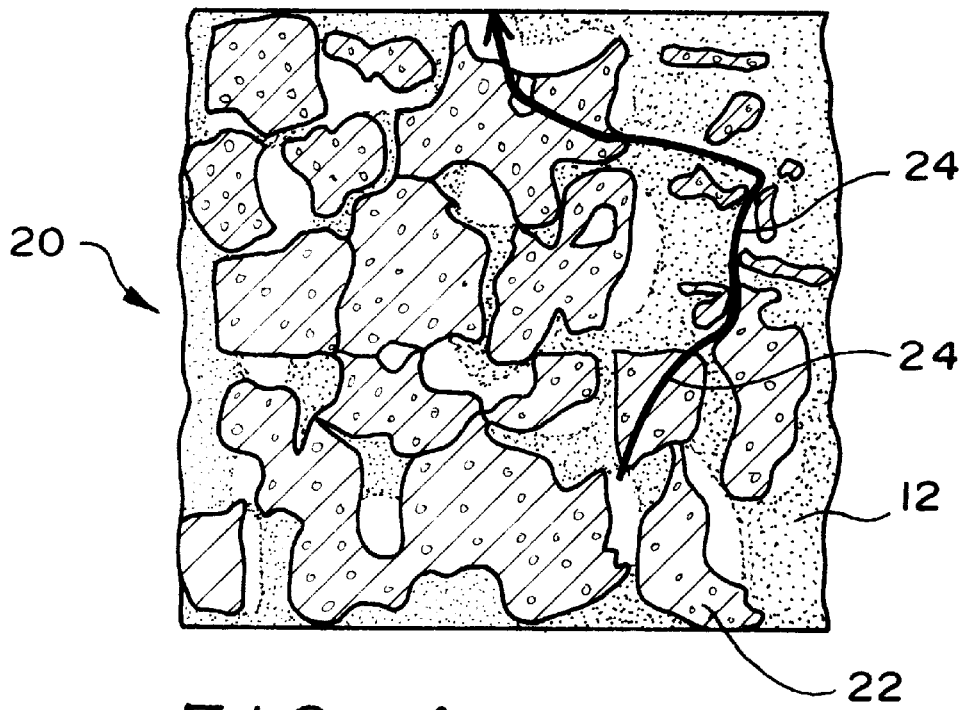
FIG. 4 is an enlarged cross-sectional view of a second embodiment of the present invention in which open-cell porous particle material is utilized showing a permeability path.

Referring now to FIG. 4, another embodiment of the present invention is illustrated, designated generally as 20. In this embodiment the particle material 22 comprises open cell porous particle material. An example of such an open cell porous particle material is pumice.

As shown in this figure, the escape path 24 for air can include the interior portions of the particle material 22. Thus, less volume percent of particle material 22 may be used while still providing sufficient permeability to prevent pop-off. The volume percent may be as low as 50%.

Example 1. As a first example for the present invention consider the fabrication of a repair material for rockets. The formulation uses EC2216 resin-Parts A & B, Part A containing 1.0±0.2% Ancamine K54 curing agent. The formulation also uses granular cork, 40 to 80 sieve.

The process begins with the weighing out of 160±1 grams of each part of a two part resin system, EC2216 directly into a 5 quart stainless steel mixing bowl. The mixture is mixed for 2 minutes on a 350 Watt Kitchen Aid Mixer equipped with a flat beater blade at the #2 mixing setting. At the conclusion of the 2 minutes, the mixer is stopped and 40 ±0.5 grams of granular cork are added to the mixture and the mixing is continued for 1 further minute at the "stir" setting. At the conclusion of this 1 minute mix, the mixer is again stopped and an additional 40±0.5 grams of granular cork are added. The composite is then mixed for another 1 minute at the "stir" setting, and a final 2 minutes at the #2 setting.

The resulting material has a pot life of 40 to 60 minutes, counted from the initial mixing of the resin. The material can be applied by hand, or trowelled into place. The resulting mixture is intrinsically permeable. This is the formulation which was tested, see FIG. 3. This composite is close to the upper bound as to the amount of cork that can be used in the formulation. The resultant composite material would be too "dry" if more cork were used and would not have sufficient strength to be used as a structural material or enough tackiness to be used as a repair material or as a coating.

Example 2. As an alternate formulation, the materials and mixing procedures described in Example 1 are used. But, the concentration of cork is limited to a total of 56 ±2 grams of cork (added in two lots of 28±1 grams as described above). This material would represent the lower limit of cork that could be used and still guarantee the intrinsic permeability required to prevent "pop off".

Figure 5:
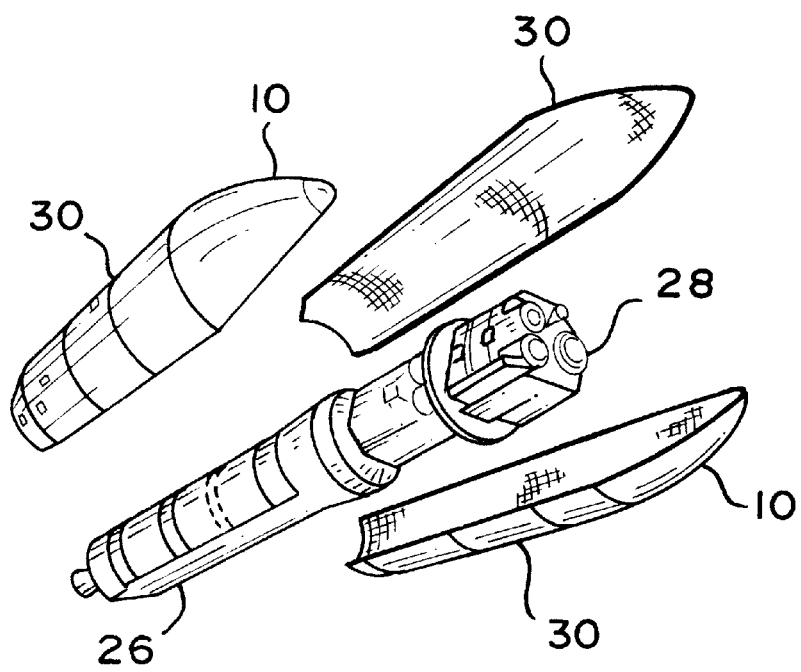
FIG. 5 is a perspective view of a launch vehicle jettisoning the payload fairings, showing the use of the composition of the present invention on the fairings.

Referring now to FIG. 5, the porous composition of the present invention is particularly adaptable for use with a launch vehicle. A rocket engine is shown, designated by numeral designation 26, which supports a satellite 28. The payload fairing 30 is split into three pieces, as shown in the figure. The porous composition 10 of the present invention is applied to the forward nose cone section of the fairing 30.

Obviously, many modifications and variations of the present invention are possible in light of the above teachings. For example, although a particle materials comprising open cell and closed cell porous materials have been discussed, non-porous particle materials may be substituted for the porous particles, in whole or in part, depending on the application. (Such applications may include those where low weight and/or low thermal conductivity is not a requirement.) It is, therefore, to be understood that, within the scope of the appended claims, the invention may be practiced otherwise than as specifically described. What is claimed and desired to be secured by Letters Patent of the United States is:

What is claimed is:

1. A porous composition for use in an environment of variable pressure and/or variable temperature, comprising:
   a mixture of a binder and a particle material, said mixture having 50 to 90 volume percent of said particle material, said binder being curable in a temperature range of 50° F. to 90° F., the resulting porous composition being intrinsically permeable, the permeability being at least about 40 liters/min/psi/in for pressure differentials up to 0.12 psi.

2. The porous composition of claim 1, wherein said particle material comprises cork.

3. The porous composition of claim 1, wherein said particle material comprises pumice.

4. The porous composition of claim 1, wherein said binder comprises a resin binder.

5. The porous composition of claim 4, wherein said resin binder comprises epoxy resin.

6. The porous composition of claim 1, wherein said volume percent is in a range of 70 to 85 and wherein said particle material comprises cork.

7. The porous composition of claim 1, wherein said particle material comprises open cell porous particle material.

8. The porous composition of claim 1, wherein said particle material comprises closed cell porous particle material, said volume percent being in a range of 70 to 90.

9. The porous composition of claim 1, wherein said particle material comprises non-porous particle material, said volume percent being in a range of 70 to 90.

10. The porous composition of claim 1, wherein said binder comprises cement binder.

11. A porous composition applicable to an exterior surface of a launch vehicle for providing thermal protection without creating contaminants, comprising:
    a mixture of a binder and a particle material, said mixture having 50 to 90 volume percent of said particle material, said binder being curable in a temperature range of 50° F. to 90° F., the resulting porous composition being intrinsically permeable, the permeability being at least about 40 liters/min/psi/in for pressure differentials up to 0.12 psi.

12. A method of forming a porous composition for use in an environment of variable pressure and/or variable temperature, comprising the steps of:
    preparing a binder, said binder being curable in a temperature range of 50° F. to 90° F.; and
    mixing a particle material with said binder wherein the resultant mixture has a 50 to 90 volume percent of said particle material, the resulting porous composition being intrinsically permeable, the permeability being at least about 40 liters/min/psi/in for pressure differentials up to 0.12 psi.

13. A method of forming a porous coating on a substrate for use in an environment of variable pressure and/or variable temperature, comprising the steps of:

preparing a binder, said binder being curable in a temperature range of 50° F. to 90° F.;

mixing a particle material with said binder wherein the resultant mixture has a 50 to 90 volume percent of said particle material, the resulting porous composition being intrinsically permeable, the permeability being at least about 40 liters/min/psi/in for pressure differentials up to 0.12 psi; and, applying the resultant mixture to a substrate.

14. The method of claim 13 wherein said step of applying the resultant mixture to a substrate comprises hand-applying said resultant mixture to said substrate.

15. The method of claim 13 wherein said step of applying the resultant mixture to a substrate comprises spraying said resultant mixture onto said substrate.

* * * * *